United States Patent
Tourapis et al.

(10) Patent No.: US 9,877,045 B2
(45) Date of Patent: Jan. 23, 2018

(54) ENCODING AND DECODING ARCHITECTURE OF CHECKERBOARD MULTIPLEXED IMAGE DATA

(71) Applicant: Dolby Laboratories Licensing Corporation, San Francisco, CA (US)

(72) Inventors: Alexandros Tourapis, Los Gatos, CA (US); Athanasios Leontaris, Mountain View, CA (US); Peshala V. Pahalawatta, Glendale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 77 days.

(21) Appl. No.: 14/951,216

(22) Filed: Nov. 24, 2015

(65) Prior Publication Data

US 2016/0080772 A1     Mar. 17, 2016

Related U.S. Application Data

(62) Division of application No. 13/119,009, filed as application No. PCT/US2009/056940 on Sep. 15, 2009, now Pat. No. 9,237,327.

(Continued)

(51) Int. Cl.
| | |
|---|---|
| *G06K 9/36* | (2006.01) |
| *H04N 19/59* | (2014.01) |
| *H04N 13/00* | (2006.01) |
| *H04N 19/597* | (2014.01) |
| *H04N 19/122* | (2014.01) |

(Continued)

(52) U.S. Cl.
CPC .......... *H04N 19/59* (2014.11); *H04N 13/004* (2013.01); *H04N 19/122* (2014.11); *H04N 19/14* (2014.11); *H04N 19/16* (2014.11); *H04N 19/597* (2014.11); *H04N 2013/0081* (2013.01)

(58) Field of Classification Search
CPC ...... H04N 19/176; H04N 19/86; H04N 19/14; H04N 5/145; H04N 21/8451
See application file for complete search history.

(56) References Cited

U.S. PATENT DOCUMENTS

| | | |
|---|---|---|
| 4,985,767 A | 1/1991 | Haghiri |
| 5,650,860 A | 7/1997 | Uz |

(Continued)

FOREIGN PATENT DOCUMENTS

| | | |
|---|---|---|
| CN | 1367611 | 9/2002 |
| CN | 1492687 | 4/2004 |

(Continued)

OTHER PUBLICATIONS

Wiegand et al.; "Overview of the H.264/AVC Video Coding Standard"; IEEE Transactions on circuits and systems for video technology, vol. 13, No. 7, Jul. 2003, pp. 560-576.*

(Continued)

*Primary Examiner* — Eueng-Nan Yeh

(57) ABSTRACT

A device includes a coder or a codec configured for interleaved image data utilizing diamond shaped blocks for motion estimation and/or motion compensation and utilizing square or orthogonal transforms of residual data. In various embodiments, the decoder may be configured, among others, to perform de-blocking on edges of the diamond shaped blocks and/or data padding at boundaries of the image data.

22 Claims, 5 Drawing Sheets

Related U.S. Application Data

(60) Provisional application No. 61/148,051, filed on Jan. 29, 2009, provisional application No. 61/099,542, filed on Sep. 23, 2008.

(51) Int. Cl.
  H04N 19/16 (2014.01)
  H04N 19/14 (2014.01)

(56) References Cited

U.S. PATENT DOCUMENTS

| | | | |
|---|---|---|---|
| 6,125,201 A * | 9/2000 | Zador | H04N 19/63 |
| | | | 375/E7.048 |
| 6,134,269 A | 10/2000 | Puri | |
| 6,144,701 A | 11/2000 | Chiang | |
| 7,319,720 B2 * | 1/2008 | Abrams, Jr. | H04N 13/0037 |
| | | | 348/E13.014 |
| 2001/0022887 A1 | 9/2001 | Lee | |
| 2002/0122510 A1 | 9/2002 | Yakhnich | |
| 2003/0156188 A1 | 8/2003 | Abrams | |
| 2003/0190079 A1 | 10/2003 | Penain | |
| 2003/0223499 A1 | 12/2003 | Routhier | |
| 2004/0008893 A1 | 1/2004 | Itoi | |
| 2004/0218269 A1 | 11/2004 | Divelbiss | |
| 2004/0223655 A1 | 11/2004 | Liao | |
| 2005/0018771 A1 | 1/2005 | Bourge | |
| 2005/0084006 A1 | 4/2005 | Lei | |
| 2006/0029136 A1 | 2/2006 | Cieplinski | |
| 2006/0153289 A1 | 7/2006 | Choi | |
| 2006/0282855 A1 | 12/2006 | Margulis | |
| 2007/0147514 A1 | 6/2007 | Yamaguchi | |
| 2008/0089405 A1 | 4/2008 | Cho | |
| 2009/0103632 A1 | 4/2009 | Choi | |
| 2009/0128620 A1 | 5/2009 | Lipton | |
| 2009/0174704 A1 | 7/2009 | Sellers | |

FOREIGN PATENT DOCUMENTS

| | | |
|---|---|---|
| CN | 201066898 | 5/2008 |
| DE | 19619598 | 11/1997 |
| EP | 0306448 | 3/1989 |
| JP | H04-183186 | 6/1992 |
| JP | H06-022290 | 1/1994 |
| JP | H06-086260 | 3/1994 |
| JP | 11018111 | 1/1999 |
| JP | 2004336104 | 11/2004 |
| WO | 03056843 | 7/2003 |
| WO | 2006137000 | 12/2006 |
| WO | 2008/127676 | 10/2008 |
| WO | 2010/011557 | 1/2010 |
| WO | 2010/088420 | 8/2010 |

OTHER PUBLICATIONS

Anonymous, "Joint Draft 2.0 of Amendment to ITU-T Rec. H.264: Constrained Baseline Profile and Supplemental Enhancement Information" 30th JVT Meeting Jan. 29, 2009 through Feb. 2, 2009.

Hur, et al., "3D HDTV Relay Broadcast Experiments Using a Terrestrial and Satellite Network in Korea" pp. 1221-1224, published on Dec. 4, 2002.

Hutchison, David, "Introducing DLP 3-D TV" pp. 1-5, Aug. 25, 2007.

Hutchison, et al., "The Design and Implementation of a Stereoscopic Microdisplay Television" IEEE Transactions on Consumer Electronics, IEEE Service Center, New York, NY US, vol. 54, No. 2, May 1, 2008, pp. 254-261.

Hutchison, et al., "The Design and Implementation of a Stereoscopic Microdisplay Television" IEEE Transactions on Consumer Electronics, IEEE Service Center, New York, NY, vol. 54, No. 2, May 1, 2008, pp. 254-261.

ITU-T Telecommunication Standardization Sector of ITU, "Advanced Video Coding for Generic Audiovisual Services"H.264, May 2003.

McCormick, et al., "Implementation of Stereoscopic and Dualview Images on a Micro Display High Definition Television" 3-DTV-Con 2008, Istanbul, Turkey, (May 2008), pp. 33-36.

SMPTE 421M-2006 "VC-1 Compressed Video Bitstream Format and Decoding Process" Apr. 2006.

Suhring, JVT reference software version JM14.2, Jan. 6, 2011.

Sullivan, et al.,"Meeting Report of the 29th JVT Meeting" Joint Video Team of ISO/IEC JTC1/SC29/WG11 and ITU-T, Oct. 13-17, 2008 in Busan, Korea.

Tagliasacchi, et al., "Symmetric Distributed Coding of Stereo Video Sequences" Image Processing 2007, IEEE International Conference on IEEE, Sep. 1, 2007, pp. 11-29.

Tamhankar, et al., "An Overview of H.264/MPEG-4 part 10" Video/Image Processing and Multimedia Communications, 2003. 4th Eurasian P Conferenced Focused on Jul. 2-5, 2003, Piscataway, NJ, vol. 1, pp. 1-51.

Tourapis, et al., "Format Extensions to the Spatially Interleaved Pictures SEI Message" JVT of ISO/IEC MPEG & ITU-T VCEG, 30th meeting, Geneva, CH, Jan. 29-Feb. 3, 2009.

Tourapis, et al., "SEI Message for Checkerboard Multiplexed Video Data" Joint Video Team of ISO, 29th Meeting, Busan, KR, Oct. 12-17, 2008.

Tseng, et al., "Compatible Video Coding of Stereoscopic Sequences Using MPEG-2's Scalibility and Interlaced Structure" Signal Processing of HDTV, VI Proceedings of the International Workshop on HDTV 1994 Turin Italy, Oct. 26-28, Amsterdam; Elsevier, NL, Oct. 26, 1994, pp. 1-10.

Vetro, Anthony, "MVC Profile/Level Definitions of Stereo" JVT Meeting of ISO/IEC MPEG & ITU-T VCEG, 28th meeting Jul. 20-25, 2008.

* cited by examiner

ENCODING AND DECODING ARCHITECTURE OF CHECKERBOARD MULTIPLEXED IMAGE DATA

CROSS-REFERENCE TO RELATED APPLICATIONS

This application a divisional application of U.S. application Ser. No. 13/119,009 filed on Mar. 15, 2011 which is national application of PCT/US2009/056940 filed on Sep. 15, 2009, which claims priority to U.S. Patent Provisional Application Nos. 61/099,542, filed 23 Sep. 2008 and 61/148,051, filed 29 Jan. 2009, hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to image data decoding.

Discussion of Background

In recent years, content providers have become interested in the delivery of stereoscopic (3D) content into the home. This interest is driven by the increased popularity and production of 3D material, but also the emergence of several stereoscopic devices that are already available to the consumer. Several systems have been proposed on the delivery of stereoscopic material to the home that combine specific video view "arrangement" formats with, primarily, existing video compression technologies such as ISO MPEG-2, MPEG-4 AVC/ITU-T H.264, and VC-1. Decoding of content is also necessary prior to display for viewing by a user.

SUMMARY OF THE INVENTION

The present inventors have realized that to ensure rapid adoption of 3D technology among consumers, the solution should be one that can be implemented with minimal or no alteration to existing playback devices such as set-top boxes, DVD, and Blu-ray disk players, as well as existing 3D capable displays. One possible solution for the delivery of 3D content without alteration of playback devices is the creating, coding, and delivering video content information by multiplexing the two views using a checkerboard arrangement (see FIG. 1). Such a system may be implemented using the MPEG-4 AVC/H.264 video coding standard or other standards (e.g., Microsoft's VC1). However, the standardized codecs do not consider the nature of the 3D encoded video signal, resulting in suboptimal coding performance.

The present invention may be configured as an extension of the current Dolby consumer level 3D video coding system that is based on MPEG-4 AVC. Similar extensions, additions, adjustments, modifications, etc. may be applicable to other systems. In such an embodiment and others, the invention extends the MPEG-4 AVC standard to more appropriately consider the characteristics of the encoded signal, allowing improved coding efficiency and performance. The invention is implemented, for example, not only at the encoder but also at the decoder. Similar extensions may be made to other encoding/decoding standards, methods, devices, and/or systems. Applications include, for example, Blu-ray video disks and may also include broadcast and download solutions which are more bandwidth constraints (among others). The invention may also be used in a scalable solution that could improve or enhance the current Dolby consumer level 3D video coding system (or other 3D and/or multi-view systems) to full resolution.

The invention in various embodiments is primarily intended for use in Dolby (or other) Stereoscopic (3D) format video encoders & decoders, but may used in other Dolby and/or non-Dolby specific equipment. Applications include, for example, Blu-ray discs, broadcast, satellite, and IPTV systems, etc.

In one embodiment, the present invention provides a method, comprising the step of modifying the transform and quantization process to be applied on de-multiplexed data to improve video coding efficiency of interleaved content. Alternatively or in conjunction therewith, the de-multiplexed data may comprise, for example, checkerboard formatted de-multiplexed data. The transform and quantization process modifications may be, for example, the only modifications affecting video coding efficiency over a standardized method. The motion estimation and compensation may be performed, for example, using a block based method that does not account for overlapping blocks.

The motion estimation and compensation may comprise, for example, intra-prediction. The video coding and decoding comprises field content based data and the method comprises a zig-zag scanning order, and motion estimation and compensation may be modified apart from the transform in a manner that account for characteristics of the content. In various embodiments, both reference and source data may be rearranged into multiple sets, each set separating data according to view and parity, and the source data may be matched with reference data for prediction (which may include, for example, both inter and intra prediction).

In other embodiments, the invention provides a method of decoding interleaved image data including the step of utilizing diamond shaped blocks for motion estimation and/or motion compensation and utilizing square or orthogonal transforms of residual data. Alternatively, or in conjunction therewith, de-blocking may be performed on edges of the diamond shaped blocks and/or data padding may be performed at boundaries of the image data.

In yet other embodiments, the invention may be embodied as a device comprising a codec configured for interleaved image data utilizing diamond shaped blocks for motion estimation and/or motion compensation and utilizing square or orthogonal transforms of residual data.

In various embodiments, the decoder may be configured, among others, to perform de-blocking on edges of the diamond shaped blocks and/or data padding at boundaries of the image data.

Portions of both the devices and methods may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
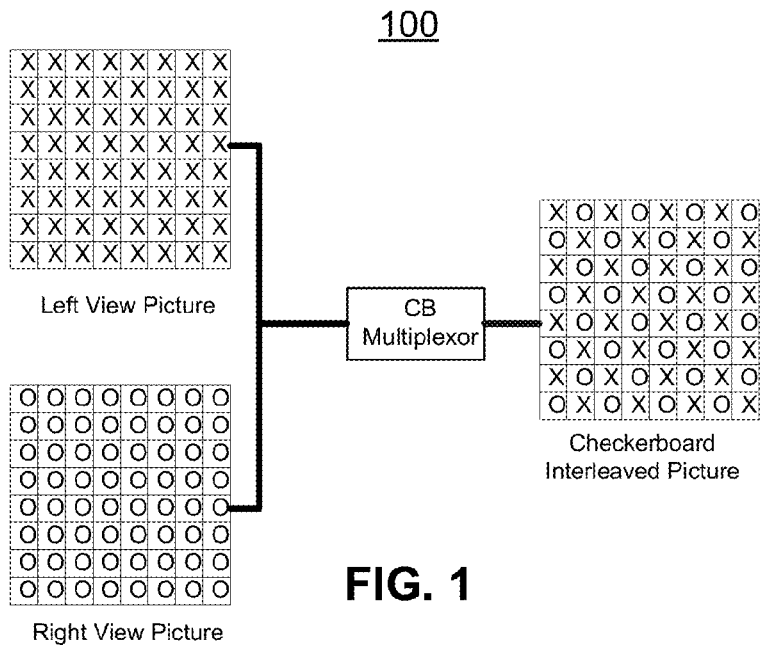
FIG. 1 is an example checkerboard interleaved arrangement for delivery of stereoscopic material.

The present inventors have realized that to ensure rapid adoption of 3D technology among consumers, the solution should be one that can be implemented with minimal or no alteration to existing playback devices such as set-top boxes, DVD, and Blu-ray disk players, as well as existing 3D capable displays. Referring now to the drawings, wherein like reference numerals designate identical or corresponding parts, and more particularly to FIG. 1 thereof, there is illustrated one possible solution (system 100) for the delivery of 3D content without alteration of playback devices, which includes, for example, the creating, coding, and delivering video content information by multiplexing the two views using a checkerboard arrangement.

Such a system may be implemented using the MPEG-4 AVC/H.264 video coding standard or other standards (e.g., Microsoft's VC1). However, the standardized codecs do not consider the nature of the 3D encoded video signal, resulting in suboptimal coding performance. In particular, these codecs have been designed and contain tools with only progressive or row interleaved (interlaced) video content in mind. These include tools such as motion estimation, motion compensation, transform, and quantization. However, checkerboard interleaved data can have very different characteristics from progressive or interlaced content. In this invention, we extend these tools to properly account for the characteristics, and therefore improve the coding efficiency, of checkerboard content.

Figure 2:
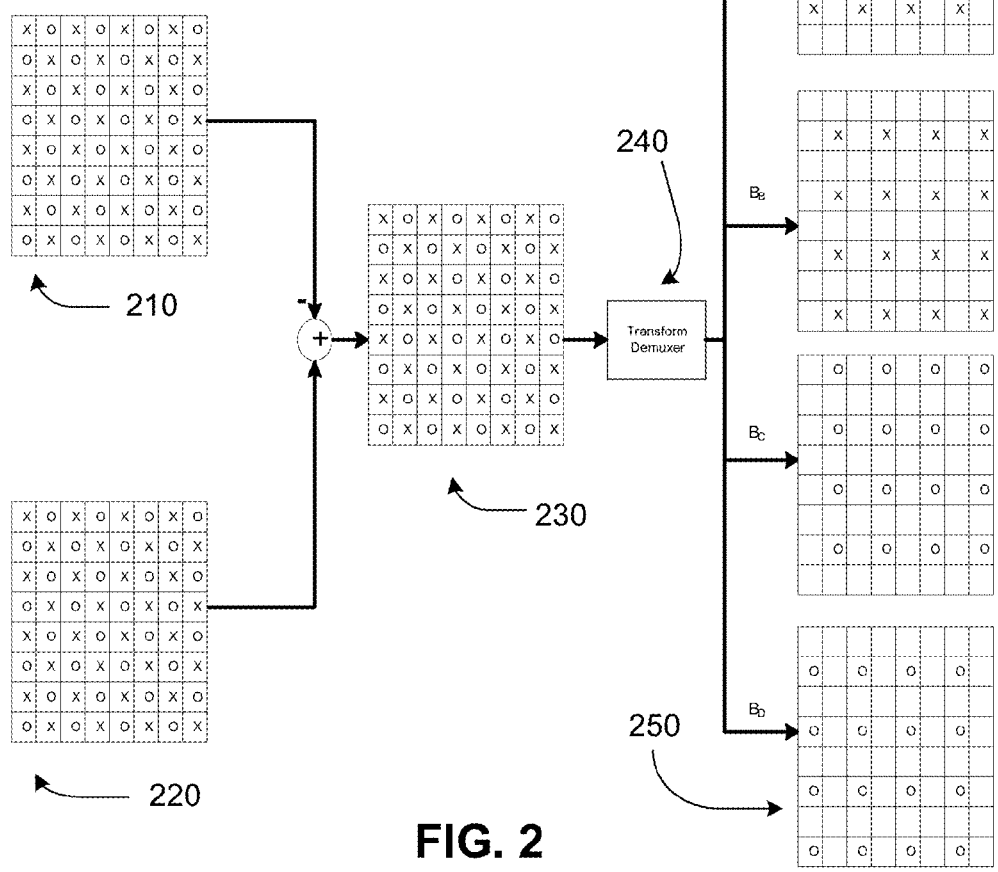
FIG. 2 is an example transform based de-multiplexing of checkerboard data in a frame mode.
Figure 4:
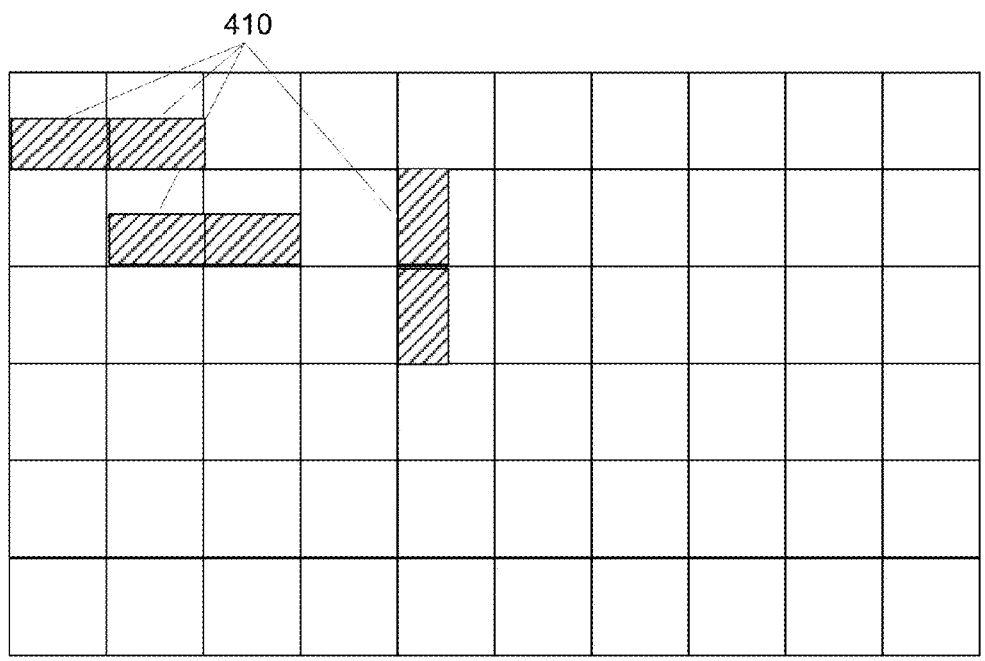
FIG. 4 is an example of block motion compensation without overlapping considerations according to an embodiment of the present invention.

In a first embodiment, video coding efficiency of checkerboard interleaved content can be achieved by only modifying the transform and quantization process to be applied on checkerboard de-multiplexed data. In particular, as can be seen also from FIG. 2, which is an example transform based de-multiplexing of checkerboard data in a frame mode. As illustrated in FIG. 2, reference checkerboard (CB) block 210 and source CB block 220 produce a residual CB block 230 which is demuxed by transform demuxer 240 into transform blocks 250. In this scenario motion estimation and compensation are performed using traditional block based methods that do not account for overlapping blocks (see e.g., FIG. 4 which is an example of block motion compensation without overlapping considerations). In FIG. 4, non-overlapping prediction using different block sizes is illustrated at 410. This process can be justified by the argument that, in general, the checkerboard multiplexed data are characterized by similar motion.

Figure 3:
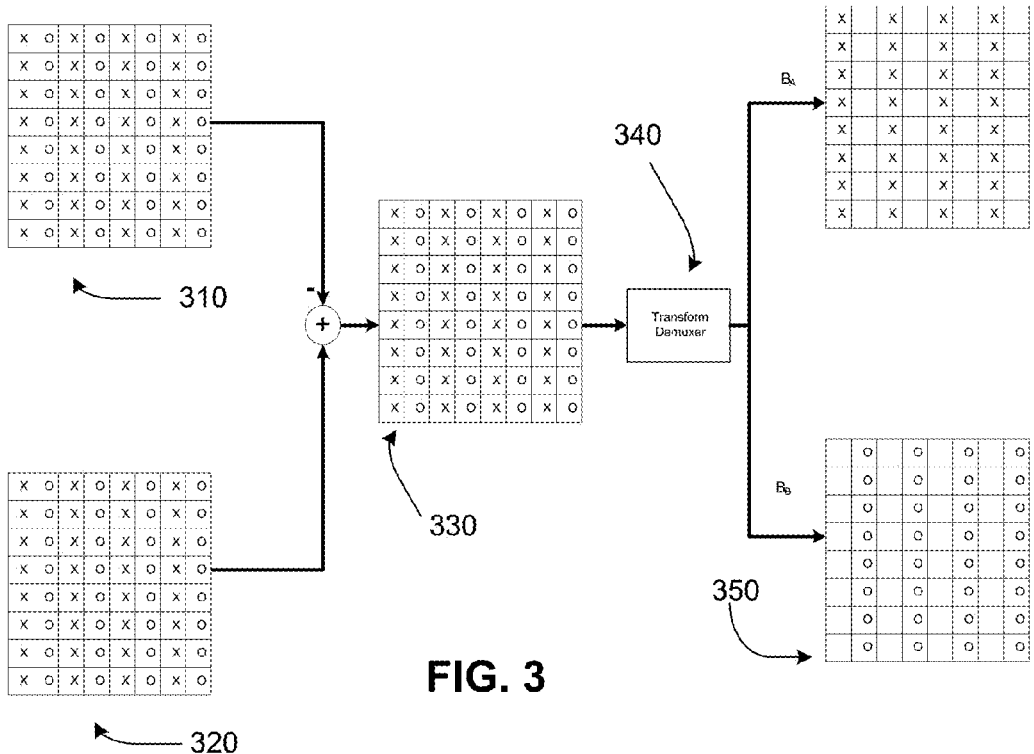
FIG. 3 is an example transform based de-multiplexing of checkerboard data in field mode.

FIG. 3 is an example transform based de-multiplexing of checkerboard data in field mode. As shown in FIG. 3, reference block 310 and source block 320 produce a residual block 330 which is demuxed by transform demuxer 340 into transform blocks 350.

However, after motion compensation or intra prediction is performed, the residual data are checkerboard de-multiplexed before transform and quantization. Given the fact that common transform methods employed in existing codecs are square or orthogonal, de-multiplexing in this scenario does not happen only in terms of different views but also in terms of rows. This would result in 4 blocks that would have to be transformed, e.g., using the 4×4 or 8×8 Integer DCT or other transform, quantized, zig-zag scanned and encoded. In another embodiment, for interlace (i.e. field) pictures, only vertical de-multiplexing may need to be performed since the data are already in the appropriate arrangement for operating such operations. This process could be signaled at the sequence, picture, slice, macroblock, or block level. The scanning order of the quantized coefficients can be also appropriately designed to account for the frequency differences in the horizontal and vertical axis. In particular, for field content the scanning order of the transformed coefficients is commonly vertically biased given the difference between horizontal and vertical frequencies. Given, however, the new coding arrangement we introduce, no such modification is necessary and the normal (i.e. zig-zag) scanning order can still be used.

Figure 5:
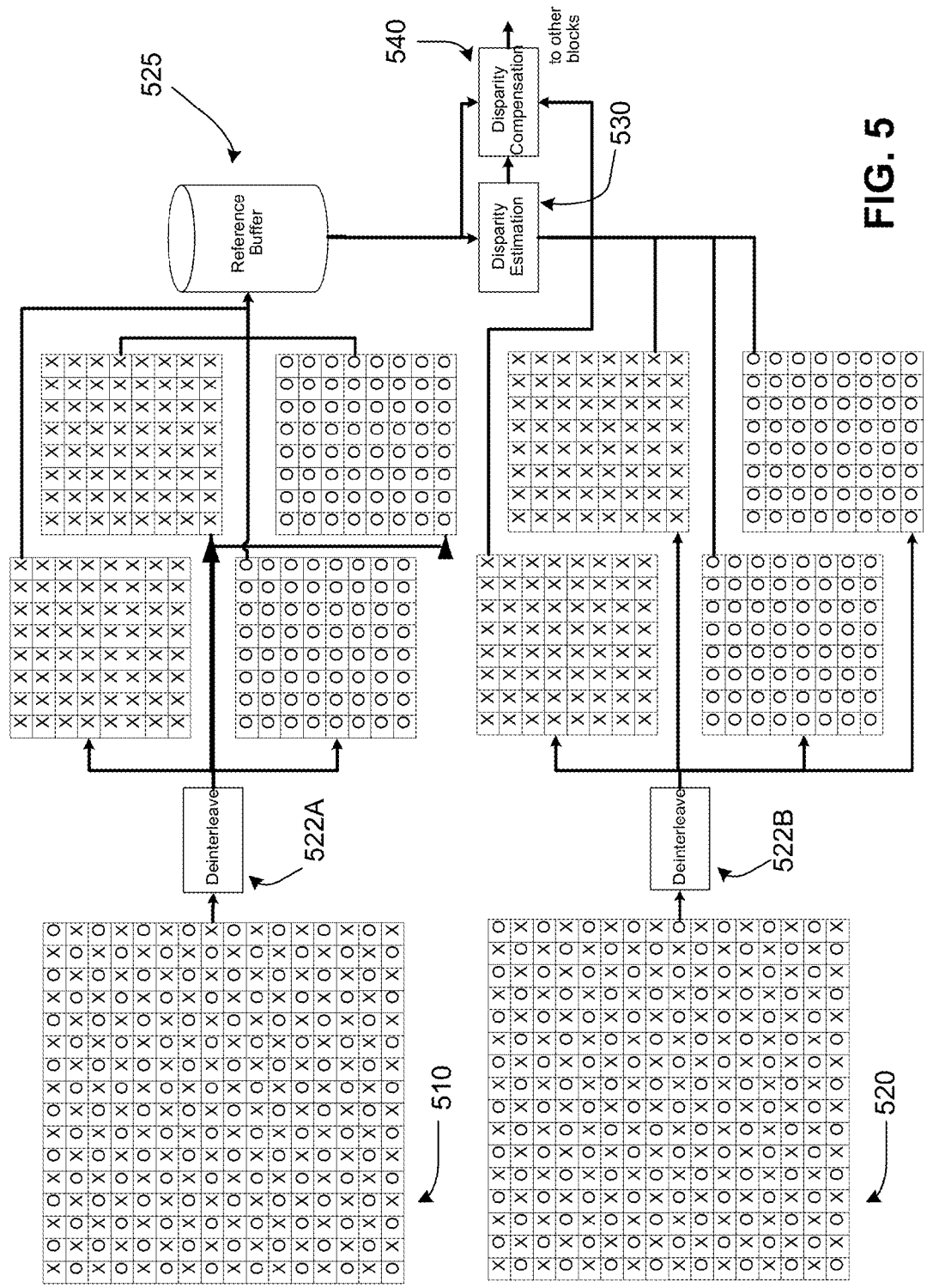
FIG. 5 is an example transform based de-multiplexing of checkerboard data in frame mode according to an embodiment of the present invention.

In an alternative embodiment, the motion estimation and compensation processes are also modified apart from the transform, in similar manner to account for the characteristics of the content. More specifically both the reference and source data are rearranged into multiple sets, each set separating the data according to view and parity. This would basically result into four (4) different arrangements (e.g., even/top or odd/bottom left and right views). This can be seen in FIG. 5, which is an example transform based de-multiplexing of checkerboard data in frame mode and illustrating de-interleaving 522A/522B of reference Image 510/Source Image 520, and components including Reference Buffer 525, Disparity estimator 530 and Disparity Compensation 540. As shown in FIG. 5, a reference image de-interleave result, comprising, clockwise, starting at the top left box, a set of "x's" from even rows of the left view picture (or CBLT (left top)), a set of "x's" from odd rows of the left view (or CBLB (left bottom)), a set of "o's" from even rows of the right view picture (or CBRT (right top)), and a set of "o's" from odd rows of the right view picture (or CBRB (right bottom)). A de-interleave in a matching format is also illustrated for a source image.

Each arrangement from the source can be matched with any of the arrangements of the reference data for prediction, which can include both intra and inter prediction. After the source data are predicted the residual data are also transformed, quantized, and coded in the same arrangement. This process can be seen as being rather similar to how interlace encoding is performed where the data are arranged into odd and even field/line data. However, in the present invention, data are further arranged into odd and even column as well. Similar to our transform method (which may be used alone or in combination with other techniques), this method can be signaled for use at the sequence, picture, slice, macroblock, or block level.

The picture level method, for example, can be seen as performing the encoding of 4 different pictures, CBLT, CBLB, CBRT, and CBRB. These four pictures can reference any previously encoded picture that is available in the buffer. Default reference list ordering, for obvious reasons is biased according to the topology of these pictures, i.e., a CBLT picture would give higher priority to previous CBLT pictures, a CBLB picture will give higher priority to previous CBLB pictures etc. Each such picture can be encoded with existing coding tools, i.e. AVC. When all pictures are decoded, they are then recombined in the frame buffer for further processing as a checkerboard image. If disabled, existing, e.g. progressive or interlace, coding methods are utilized such as the one already available in MPEG-4 AVC or VC1. It should be noted that the various methods of signaling enable combinations of legacy methods with our approach at the picture, slice, macroblock, or/and block level similar to what already exists in MPEG-4 AVC for interlace coding.

Figure 6:
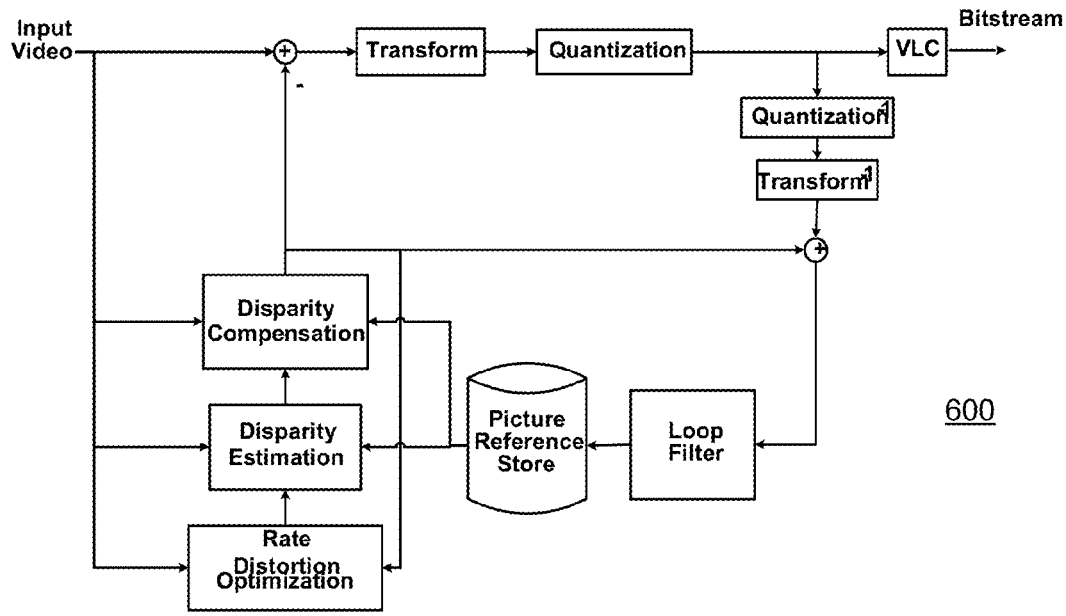
FIG. 6 is an example video encoder according to an embodiment of the present invention.
Figure 7:
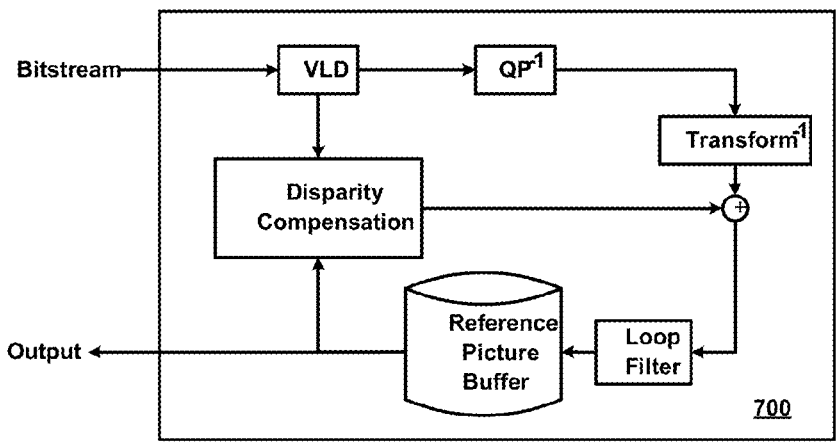
FIG. 7 is an example video decoder according to an embodiment of the present invention.

In a further embodiment, de-blocking of pixel data, using such a method is applied only across pixels of the same set. An encoder 600 and decoder 700 employing such methods can be seen in FIG. 6 and FIG. 7 respectively.

Figure 8:
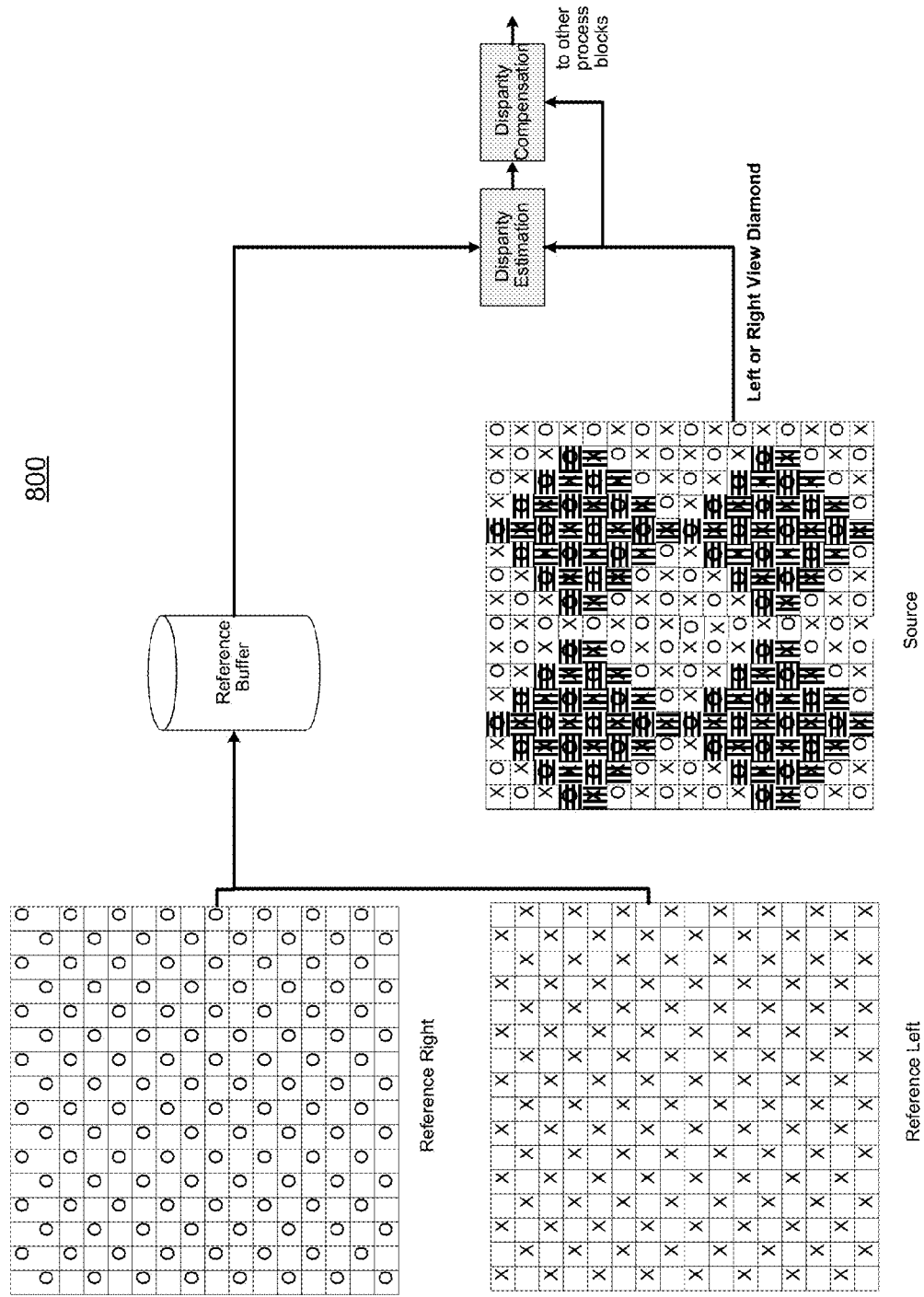
FIG. 8 is an example of, instead of utilizing square blocks for processing, diamond blocks being utilized that fully consider the nature of the content.

In an additional embodiment, given the characteristics of the content, instead of utilizing square or orthogonal blocks for prediction, transform and quantization, we can instead consider diamond blocks. FIG. 8 is an example of a system 800 that, instead of utilizing square blocks for processing, diamond blocks being utilized that fully consider the nature of the content. In FIG. 8, where darkened horizontal striped "o" pixel components (diamond shaped) of an exemplary right view picture, and darkened vertical striped "x" pixel components directly below each darkened horizontal striped "o" pixel component (also diamond shaped) of an exemplary left view picture are shown). That is, motion estimation and compensation are now employed with diamond shaped blocks of size N×M, while the transform of the residual data can be performed by using square or orthogonal transforms by first rotating the residual by an appropriate angle (e.g. 45 degrees). De-blocking is performed in this scenario on the edges of the diamond block data. Furthermore, image boundaries are processed by appropriately padding the data. The method can again be enabled at the sequence, picture, slice, macroblock or block level and can be combined with any of the previous described methods. However, it is preferred, primarily due to complexity and performance reasons, that this method is considered mainly at the sequence or picture level.

In yet another embodiment, any of the above methods could be utilized for the encoding of not only checkerboard interleaved images but also of residual data from checkerboard interleaved images, or a combination of four images that are interleaved using a periodic square tiling method.

Obviously, numerous modifications and variations of the present invention are possible in light of the above teachings. It is therefore to be understood that within the scope of claims to be included in a subsequently filed utility patent application, the invention may be practiced otherwise than as specifically described herein.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a part or process of the present invention, any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to reference buffers, de-multiplexers, estimators, compensation devices/mechanisms, codecs, formats, patterns, etc., should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, motion estimation, motion compensation, color correction, prediction, transformations, interleaving/de-interleaving, identifying blocks, and performed at any level including, without limitation, the sequence, picture, slice, block and macro-block levels, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of decoding interleaved image data, the method comprising:
    obtaining interleaved image data comprising image data arranged in rows and columns and residual data;
    decoding the interleaved image data to yield decoded image data by a decoding process, the decoding process comprising the steps of:
    performing motion estimation and/or motion compensation on the image data utilizing diamond shaped blocks to yield processed image data, wherein boundaries of the diamond shaped blocks are non-aligned with and intersect plural rows and columns of the image data;
    performing transforms of the residual data utilizing square or orthogonal transforms;
    combining the transformed residual data and the processed image data to yield the decoded image data; and
    outputting the decoded image data for display.

2. The method according to claim 1, wherein decoding the interleaved image data comprises de-blocking and the de-blocking is performed on edges of the diamond shaped blocks.

3. The method according to claim 1, wherein decoding the interleaved image data comprises data padding and the data padding is performed at boundaries of the image data.

4. The method according to claim 1, wherein:
    said method is embodied in a set of computer instructions stored on a non-transitory computer readable media;
    said computer instructions, when loaded into a computer, cause the computer to perform the steps of said method.

5. The method according to claim 4, wherein said computer instructions are compiled computer instructions stored as an executable program on said non-transitory computer readable media.

6. The method according to claim 1, wherein the method is performed by a device comprising at least one of an OTT (over-the-top) device (e.g., a set-top box), a DVD player, a Blu-ray player, and a display.

7. The method according to claim 1, wherein the method is performed at a playback device and the interleaved image data is interleaved left and right views of 3D encoded video, the interleaved data further formatted in a standards based codec that does not consider the nature of the 3D encoded video.

8. The method according to claim 7, wherein the standards based codec comprises the AVC/H.264 video coding standard.

9. The method according to claim 7, wherein the standards based codec comprises an MPEG coding standard.

10. The device according to claim 7, wherein the standards based codec comprises a consumer level 3D video coding system that is based on MPEG-4 AVC.

11. The method according to claim 1 wherein performing transforms of the residual data comprises rotating the residual by an angle.

12. A device for decoding interleaved image data, the device comprising:
    an input for receiving the interleaved image data;
    a codec configured to process the received interleaved image data to yield decoded image data, wherein the interleaved image data comprises image data arranged in rows and columns and residual data, the codec utilizing diamond shaped blocks for motion estimation and/or motion compensation to yield processed image data, wherein boundaries of the diamond shaped blocks are non-aligned with and intersect plural ones of the rows and columns of the interleaved image data, the codec configured to transform the residual data utilizing square or orthogonal transforms and configured to combine the transformed residual data and the processed image data to yield the decoded image data; and
    an output for outputting the decoded image data for display.

13. The device according to claim 12, wherein the codec is further configured to perform at least one of de-blocking performed on edges of the diamond shaped blocks and data padding at boundaries of the image data.

14. The device according to claim 12, wherein the device comprises at least one of a set-top box, DVD player, Blu-ray player, and a 3D capable display.

15. The device according to claim 12, wherein the device comprises a playback device and the interleaved image data comprises interleaved left and right views of 3D encoded video, the interleaved data further formatted in a standards based codec that does not consider the nature of the 3D encoded video.

16. The device according to claim 15, wherein the standards based codec comprises the AVC/H.264 video coding standard.

17. The device according to claim 15, wherein the standards based codec comprises an MPEG coding standard.

18. The device according to claim 12 wherein the device is part of a connected download or broadcast video solution.

19. The device according to claim 12, wherein the device provides a scalable solution that improves or enhances a multiview coding system upconverting it to full resolution.

20. The device according to claim 12 wherein the device is built into at least one of a set-top box, video player including Blu-ray, and a display.

21. The device according to claim 20, wherein the device is part of at least one of a broadcast, satellite, and IPTV system.

22. The device according to claim 12 wherein the codec is configured to, in transforming the residual data, to rotate the residual data by an angle.

* * * * *